United States Patent [19]
Creswick et al.

[11] 3,948,314
[45] Apr. 6, 1976

[54] THERMODYNAMICALLY INTEGRATED BUILDINGS

[75] Inventors: William E. Creswick, Sault Ste. Marie; Cyril F. T. Rounthwaite, Toronto, both of Canada

[73] Assignee: Isothermic Systems Ltd., Sault Ste. Marie, Canada

[22] Filed: Dec. 18, 1973

[21] Appl. No.: 425,771

Related U.S. Application Data
[63] Continuation-in-part of Ser. No. 231,600, March 3, 1972, abandoned.

[30] Foreign Application Priority Data
Mar. 8, 1971   Canada................................. 107096

[52] U.S. Cl. ........................... 165/48; 52/2; 52/168; 137/360; 165/53; 165/56
[51] Int. Cl.² ......................................... F25B 29/00
[58] Field of Search .............. 165/49, 50, 4.6, 1, 47, 165/48, 53, 56; 137/360; 52/2, 404, 405, 168

[56] References Cited
UNITED STATES PATENTS
| | | | |
|---|---|---|---|
| 2,641,449 | 6/1953 | Antony.................................. | 165/49 |
| 3,415,024 | 12/1968 | Kotlarz................................. | 165/53 |
| 3,616,583 | 11/1971 | Welneck............................... | 52/168 |

*Primary Examiner*—Albert W. Davis, Jr.
*Assistant Examiner*—Daniel J. O'Connor
*Attorney, Agent, or Firm*—Spencer & Kaye

[57] ABSTRACT

A building structure includes a plurality of structural load bearing wall portions in thermal contact with the external atmosphere and further load bearing means located inside the building structure in thermal contact with the internal atmosphere of the building. The structural load bearing wall portions are formed by a plurality of liquid tight, hollow load bearing panel members for the flow of a liquid at a preselected temperature therethrough. Each of the panel members includes inlet means for the introduction of liquid therein and outlet means for the removal of liquid therefrom. The panel members and their inlet and outlet means are arranged and connected in fluid flow relation to provide a predetermined flow pattern of the liquid through the load bearing structural wall portions. Pumping means are connected in fluid flow relation to the panel members for forcing liquid through said wall portions. Heat transfer means for maintaining the liquid passing through said wall portions at a temperature related to the temperature of the internal atmosphere of the building whereby to improve the stability of the building structure by reducing or eliminating differential thermal expansion between the structural load bearing walls and said further load bearing means are also provided.

13 Claims, 27 Drawing Figures

FIG. I.

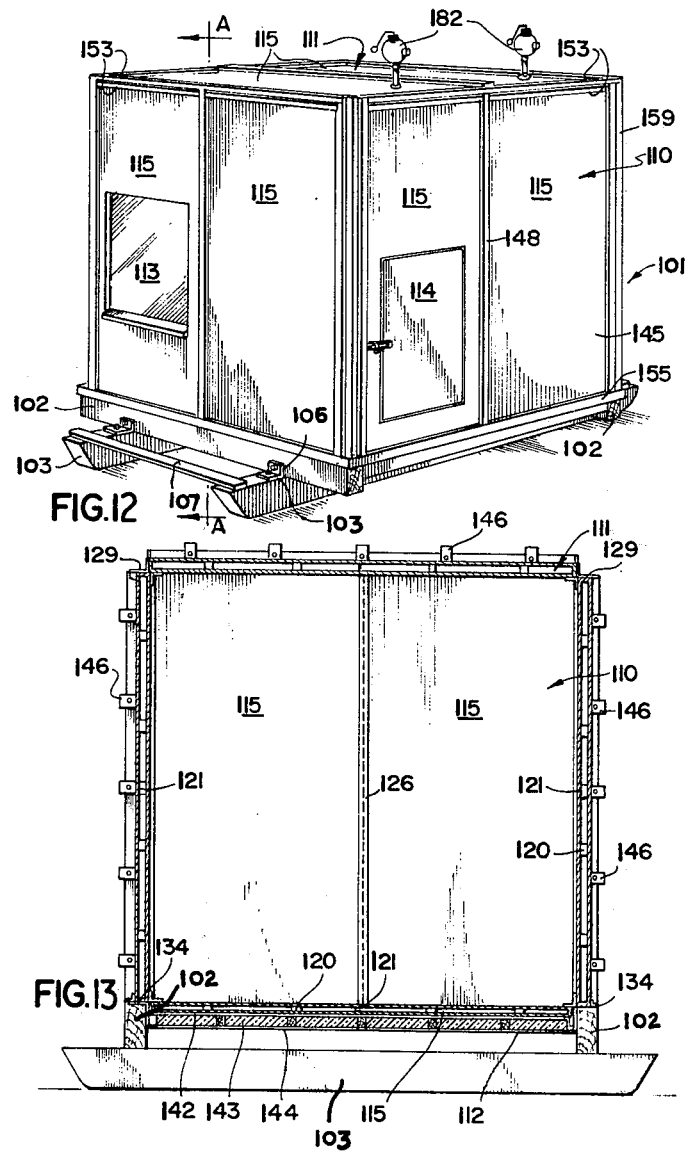

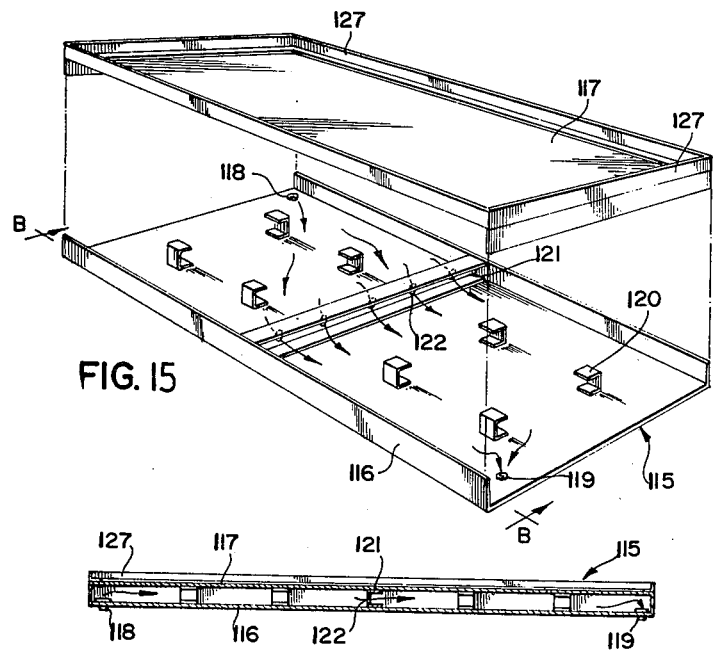
FIG. 15
FIG. 16
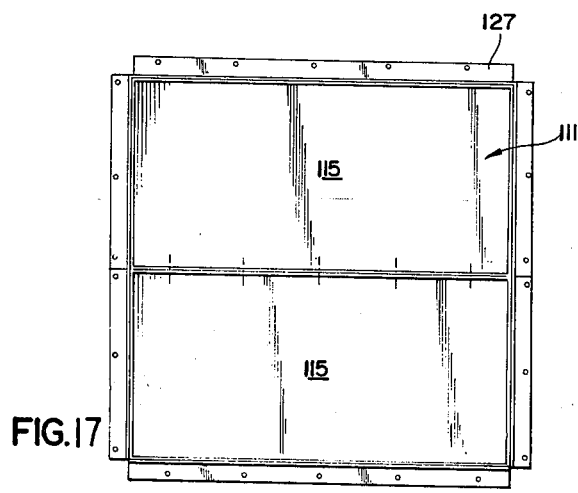
FIG. 17

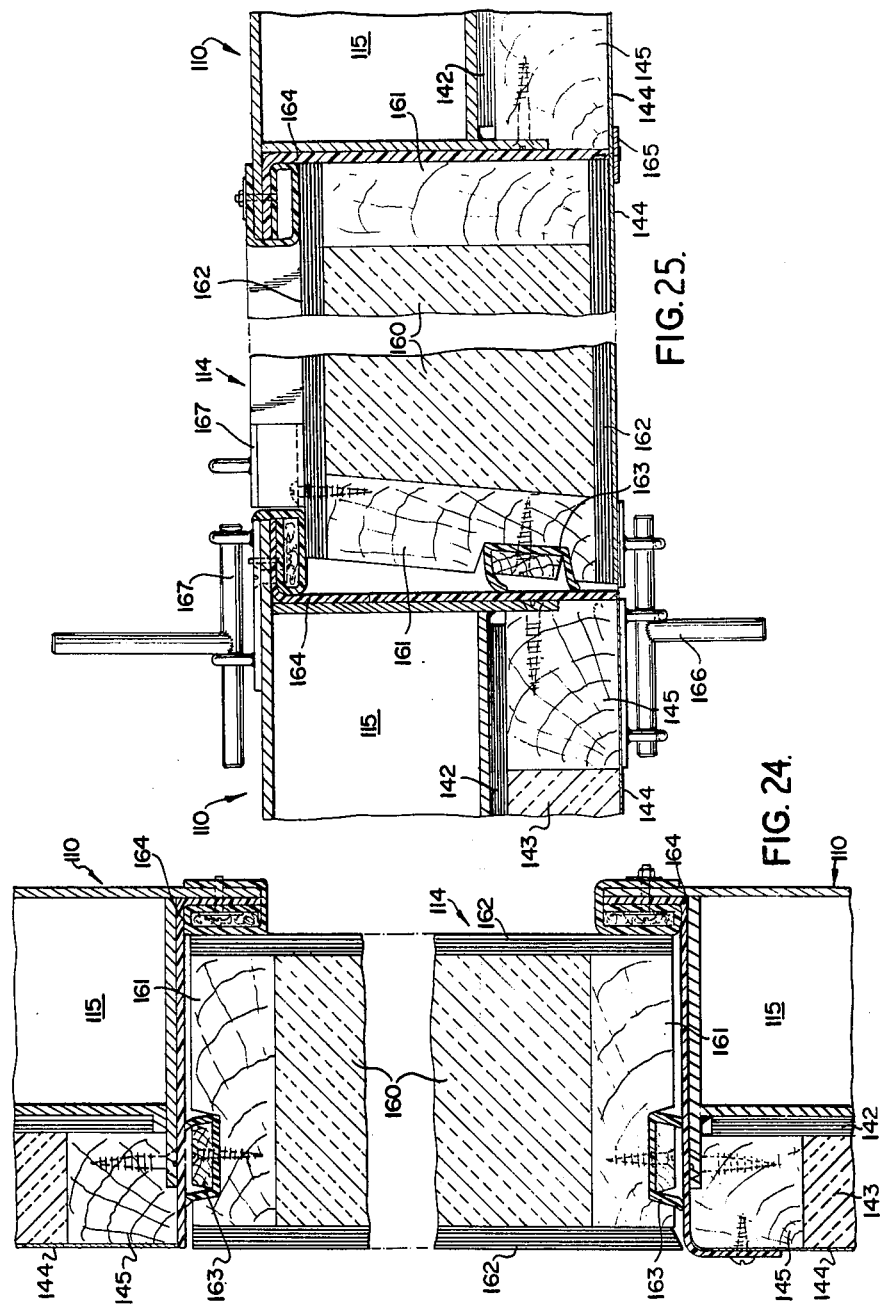

THERMODYNAMICALLY INTEGRATED BUILDINGS

This is a continuation-in-part of application Ser. No. 231,600 filed Mar. 3, 1972, now abandoned.

This invention relates to buildings and certain other structures and is particularly concerned with ways and means for maintaining the structure at a uniform temperature throughout its extent to improve its stability.

While the temperature of the internal atmosphere of a building structure may be maintained substantially constant, for example, around 70°F., the atmosphere externally of the building can vary considerably. In certain climates, winter temperatures may be substantially below 0°F. with summer temperatures, on certain days, in the order of 100°F. There are also the day to day fluctuations in temperature to be contended with. These temperature differentials between the internal and external atmosphere of a building and the fluctuations in external temperature which occur daily impose severe structural strains on buildings and various measures have been taken in the past in an attempt to alleviate the situation. Structural stresses are imposed due to the fact that the internal support columns of a building, for example, remain at a substantially constant temperature equal to the temperature of the internal atmosphere of the building whereas the external walls of the building in thermal contact with the external atmosphere contract and expand in response to the external temperature fluctuations. In curtain wall structures, i.e. structures where the walls do not perform a load supporting function, but rather are supported from the building floors and internal support columns, this does not pose a particularly serious problem in that suitable expansion means may be provided in the curtain wall and/or in the means connecting the curtain wall to the support structure. The situation is different, however, in cases where the walls which are in thermal contact with the external atmosphere perform a load bearing function. In such cases the floors of the building are connected to these external walls and rely upon these walls for support. Since these walls expand and contract in response to external temperature fluctuation, and since the internal support columns or structures do not expand and contract since they are at the same temperature as the substantially constant internal atmosphere of the building, it is obvious that severe structural stresses are imposed on the building floors and on the means connecting such floors to the internal support columns and the external load bearing walls. In addition to these problems there is the problem of non-uniform heat flow through the wall portions of the building including the top and bottom wall portions of the buildings (i.e. the roof and floor portions respectively) and this non-uniform heat flow resulting in a non-uniform temperature distribution throughout the building causes great strain within such wall portion resulting, among other things, in cracks and other faults in the building structure.

It is accordingly an object of the present invention to provide improvements in building structures and a method of operation which substantially reduces non-uniform temperature distribution conditions within such structures, and promotes dimensional stability thereof thus reducing stresses in same. Other objects and advantages will be apparent from the following description and claims.

The invention in a further aspect provides a building structure wherein the walls of same which are in thermal communication with the external atmosphere are adapted to bear at least a portion of the loads imposed by the structure, said load bearing walls being formed by a plurality of contiguous, liquid tight, hollow panels each panel including an outwardly facing wall portion in thermal communication with the external atmosphere and an inwardly facing wall portion spaced from the first mentioned wall portion and in thermal communication with the internal atmosphere of the building structure so that when an aqueous liquid flows through each panel such liquid is in direct contact with the respective spaced apart inner surfaces of said outwardly and inwardly facing wall portions, each of said panels including inlet means for the introduction of liquid therein and outlet means for the removal of liquid therefrom, said inlet and outlet means of said panels being connected to provide such flow of the aqueous liquid through said panels, pumping means for forcing the liquid through said panels, and heating or cooling means for maintaining the temperature of the aqueous liquid passing through said panels whereby to maintain said load bearing wall substantially at a selected temperature to improve the stability of the building structure.

The invention is particularly important in relatively tall, multi-story building structures because there the problem of differential thermal expansion between the interior support columns and the external load bearing walls becomes more acute the higher the building.

The liquid which is passed through the structural load bearing portions is preferably and aqueous liquid e.g. water or water containing anti-freeze in cases where freezing conditions may be encountered.

In the preferred form of the present invention the panel members for use in the building structures are in the form of hollow steel sections which form an integral and functional part of the load bearing wall portion of the building structure. Each panel member is connected to its neighbour adjacent its marginal edges and suitable fluid flow means are provided to provide the desired flow pattern of the liquid through the panels via the inlets and outlets therein.

In the case of a building structure, for example, the liquid is circulated through the wall portions by a pump while the temperature of the liquid, which is desirably just about room temperature, is maintained in cold climates by means of a heater and in their warm climates by means of a cooling system. In multi-storey building structures and in other large building structures the total flow pattern of the liquid is divided into separate independent circuits with arrangements being made to maintain the hydrostatic head within the allowable working pressure of the wall sections or panels.

Since the circulating liquid maintains the steel building structure at a temperature approximately equal to room temperature, the possibility of low temperature brittle fracture in the steel in cold climates is reduced and furthermore the liquid filled steel structural members offer much better fire resistance than conventional designs with the sound proofing of the building also tending to be improved while at the same time an even healthy environment is maintained within the building. Furthermore, because of the large mass of the circulating liquid, such liquid has a very high thermal capacity and this factor can be put to good use in the conservation of energy.

It will thus be seen that the present invention provides structures which are useful under all atmospheric conditions whether the ambient temperatures are relatively high such as in tropical regions or low such as in northern regions.

It is to be emphasized here that the present invention is not to be confused with known types of heating or cooling systems for buildings which employ panels through which liquids at the desired temperature are circulated. Since, in practice, the liquid circulating through applicants' load bearing structural wall portions is at essentially the same temperature as the internal atmosphere of the building, there is little or no heat transfer between such internal atmosphere and applicants' load bearing walls. At the same time, because applicants' load bearing wall system is maintained at a substantially constant temperature by the liquid passing therethrough, outside heating and cooling loads are prevented from passing through such walls. Thus it can be said that although the system of the invention does not directly heat or cool the building, it does in fact isolate the building from external heating and cooling loads. If the entire exterior surface of the building structure were comprised of panel members through which liquid is circulated in accordance with the invention, there would, theoretically, be no need for any auxiliary heating or cooling means. However, since in a practical system doors and windows are required, it is obvious that a certain amount of heat transfer will occur through such doors or windows in the usual fashion. It is therefore apparent that the heating or cooling load imposed by the doors and windows etc. will have to be compensated for by auxiliary heating or cooling means, which auxiliary heating or cooling means may be of an entirely conventional nature as will be seen more clearly hereinafter.

The present invention will be further illustrated by way of examples, reference being had to the accompanying drawings in which:

FIG. 12 is a perspective view of a prototype building structure employing the principles of the present invention;

FIG. 13 is a vertical section taken along the line A—A in FIG. 12 with the insulation omitted from the side and top wall portions;

FIG. 15 is an exploded perspective view of a panel member used in the structure of FIG. 12;

FIG. 16 is a section taken along the line B—B in FIG. 15;

FIG. 17 is a plan view of the top wall portion (roof) of the structure of FIG. 12;

FIG. 24 is a detail vertical section of the door in the structure of FIG. 12;

FIG. 25 is a detail cross section of the door in the structure of FIG. 12;

Figure 1:
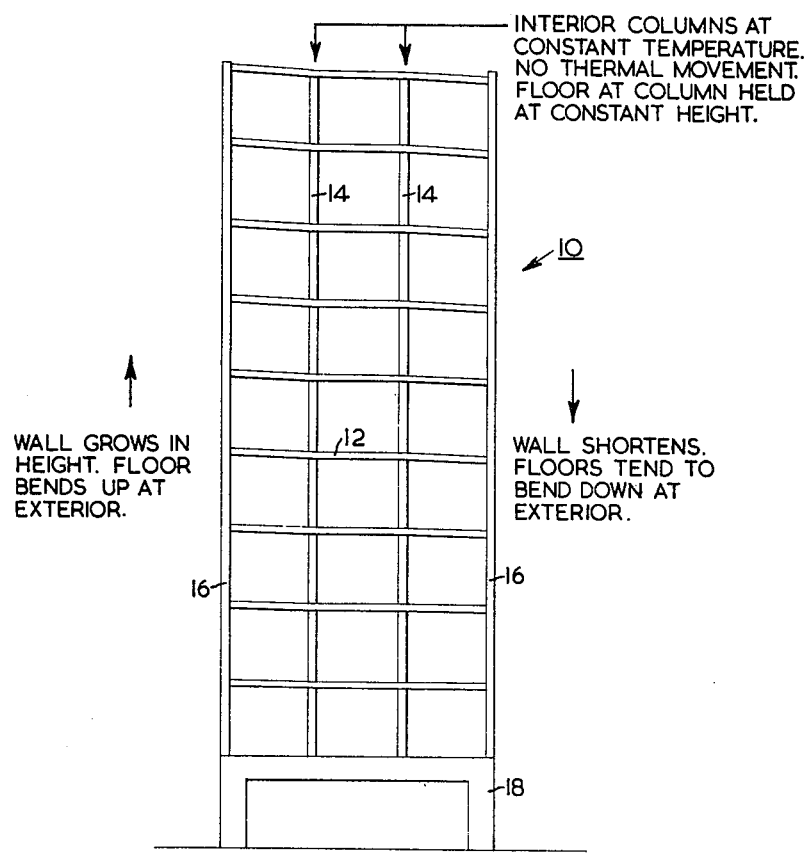
FIG. 1 is a side elevation view illustrating the effect of thermal movement on a conventional building.
Figure 2:
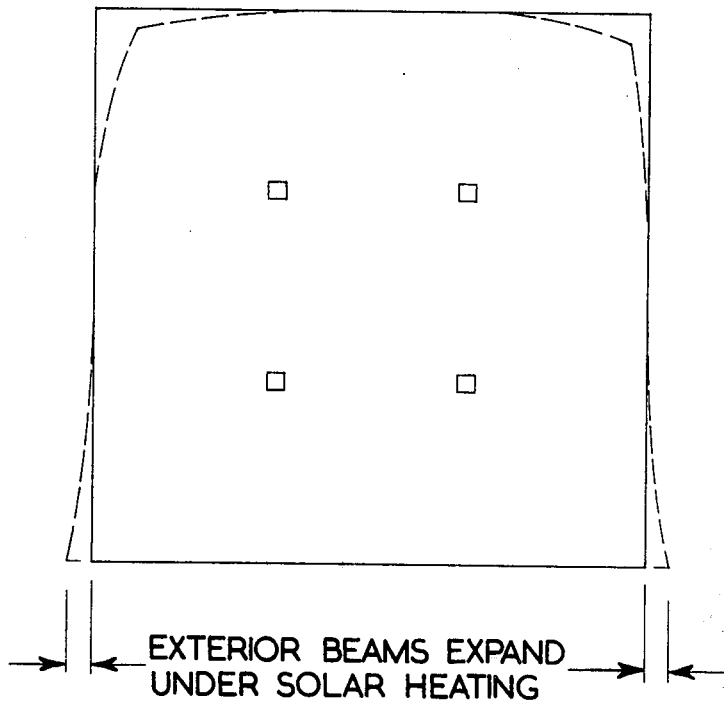
FIG. 2 is a plan view of a floor of building illustrating the effect of thermal movement under differential heating.

With reference now to FIGS. 1 and 2 of the drawings, an attempt has been made to illustrate the effects of external temperature variations on a conventional building. Some mention will first of all be made about the building structure 10 shown in FIG. 1. The building is of the multi-storey variety and includes a plurality of floor slabs 12 of any suitable conventional construction and a series of suitable conventional internal support columns 14. The entire building is surrounded by a structural load bearing wall 16. The marginal portions of the floors 12 are attached to walls 16 in any suitable fashion for support thereby. The building also includes a suitable foundation support 18 which serves to support the load bearing external walls 16 and the internal floor support columns 14.

As indicated above, FIG. 1 illustrates the effect of temperature changes on a conventional building. On a cold sunny day, with the sunlight striking the left side of the building (as seen in FIG. 1) and with the opposite side of the building being in shadow, the temperature of the wall 16 exposed to sunlight increases whereby the wall grows in height. On the opposite side, the wall 16 tends to shorten since it is in thermal contact with the cold air. However, the interior columns 14 are held at constant temperature equal to the inside temperature of the building. There is no thermal movement of same and the floors 12 are held at constant height in the regions of the support columns. However because of the increase in height of the external load bearing walls on one side of the building and the shortening of the load bearing walls on the other side of the building, the floors tend to be deflected upwardly on the warmer side and downwardly on the cooler side, as the case may be. This imposes severe structural strains on the floors and the means for connecting same to the columns and walls thus resulting in cracks and other structural faults.

Those skilled in the art will appreciate that the situation shown in FIG. 1 is only one of several possibilities. For example, on a cold cloudy day, all of the structural walls of the building will be shortened whereby all of the floors will tend to be bent downwardly towards the exterior of the building. On a hot day the opposite effect will occur i.e. the load bearing walls will grow in height and the floors will be bent upwardly at the exterior.

FIG. 2 is a plan view of one of the building floors illustrating the expansion of the exterior beams under solar heating on one side of the building and, in dotted lines, the contraction of the exterior beams on the opposite side of the building under cooling conditions.

In order to alleviate the problems indicated above, the present invention, as previously described, provides structural load bearing walls formed by a plurality of contiguous liquid tight hollow load bearing panels arranged for the flow of a liquid therethrough. Suitable pumping means are provided for moving the liquid through the panels and heating or cooling means are provided for maintaining the temperature of the liquid passing through the panels at a desired level.

Figure 11:
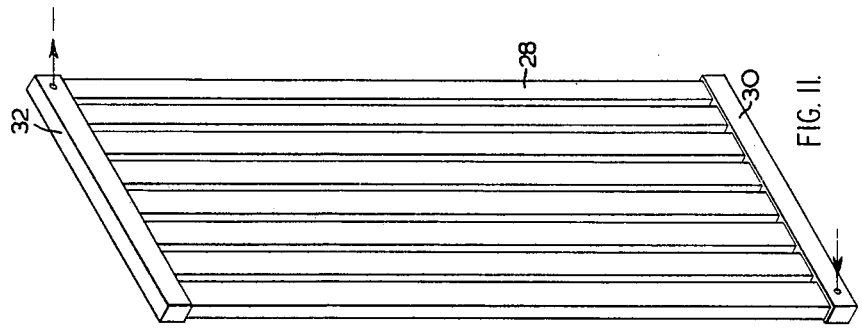
FIGS. 9, 10 and 11 illustrate various types of liquid filled panels for use in the structural load bearing walls according to the invention.
Figure 10:
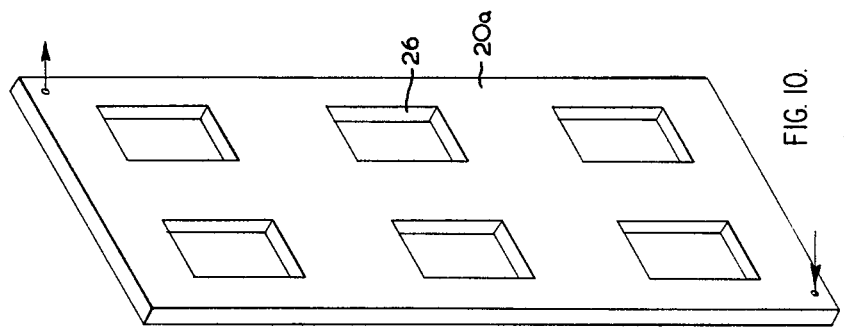
Figure 9:
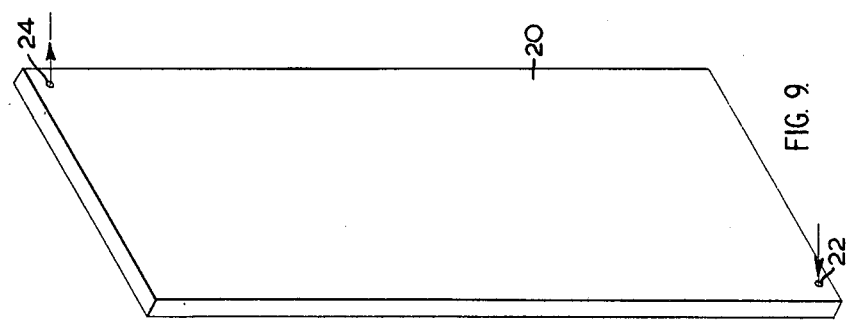
Figure 14:
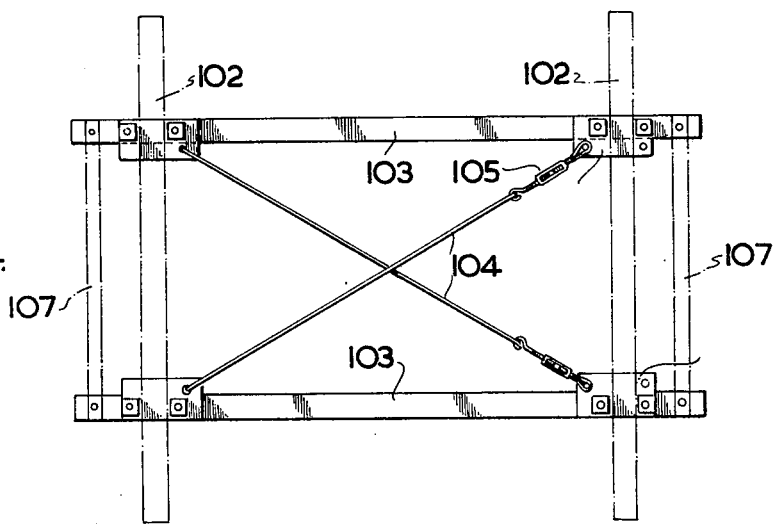
FIG. 14 is a plan view of a framework upon which the prototype structure of FIG. 12 is supported.
Figure 18:
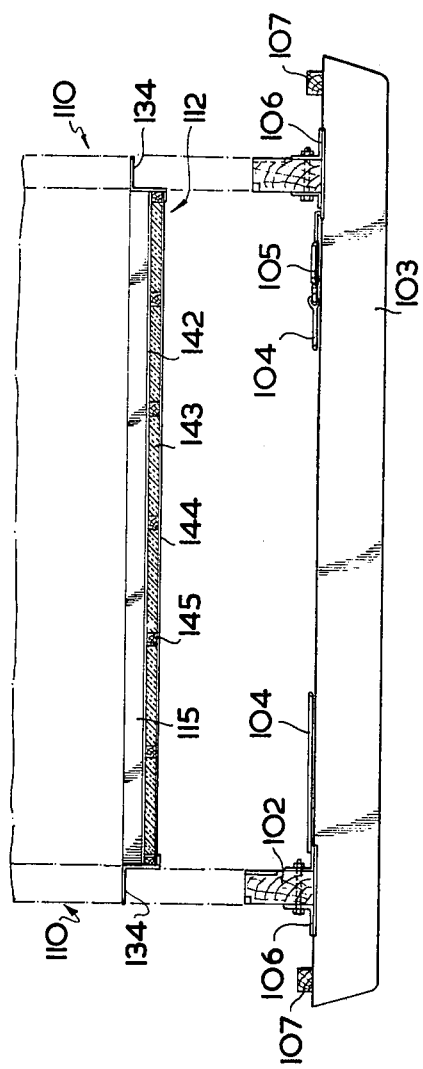
FIG. 18 is a detail vertical section of the lower portion of FIG. 13

Typical panels for use in forming the load bearing walls are illustrated in FIGS. 9, 10 and 11. FIG. 9 illustrates a single water filled panel one module high, such panel being designated by the reference numeral 20. The panel is provided with a liquid inlet 22 adjacent a lower corner thereof and a liquid outlet 24 adjacent a diagonally opposite corner. Any suitable baffle means may be provided within such panel so as to ensure circulation of the liquid to all parts of the panel when in use. As will be described in more detail hereinafter the panels are hollow and are made of structural steel sufficiently thick as to withstand the stresses imposed upon same by the overall building structure. Adjacent panels are joined to each other at their marginal edges using suitable clips or angle irons or by welding. It is also customary to apply a layer of insulation to the outside of the panel members to lessen the effect of external heating and cooling loads on the temperature of the liquid in the panel. As mentioned previously this liquid is maintained close to a constant temperature i.e. room temperature.

While the panel shown in FIG. 9 makes no provision for windows, windows may, of course, bee incorporated in the panel and accordingly panel 20a shown in FIG. 10 employs a plurality of window openings 26. It will be seen that three pairs of windows are provided and those skilled in the art will realize that this panel is actually some three floors high. The window assemblies fit directly into the window openings and may be readily sealed thereto.

A further variation is illustrated in FIG. 11 wherein it will be seen that the panel is fabricated from a series of spaced apart parallel tubes 28 which extend between liquid supply header tube 30 and a liquid return header tube 32. As with the previously described panels, the headers and tubes must be made sufficiently strong as to withstand the structural stresses imposed thereon by the building structure. Furthermore, care must be taken to keep the spacing between tubes 28 to a minimum or else the panel as whole will not be capable of isolating the interior of the building from exterior heating and cooling loads. The exterior heating and cooling loads can pass between widely spaced tubes and thus a conventional heating and cooling system will have to be provided to offset these loads. The tubes could, of course, be square or round, oval etc. as desired.

Regardless of the precise structure or configuration of each panel it will be seen that each panel includes an outwardly facing wall portion which is in thermal communication with the external atmosphere and an inwardly facing wall portion which is spaced from the outwardly facing wall portion and in thermal communication with the internal atmosphere of the building. The liquid which circulates through such panels is, of course, in direct contact with the inner surfaces of said spaced apart inwardly and outwardly facing wall portions.

Figure 3:
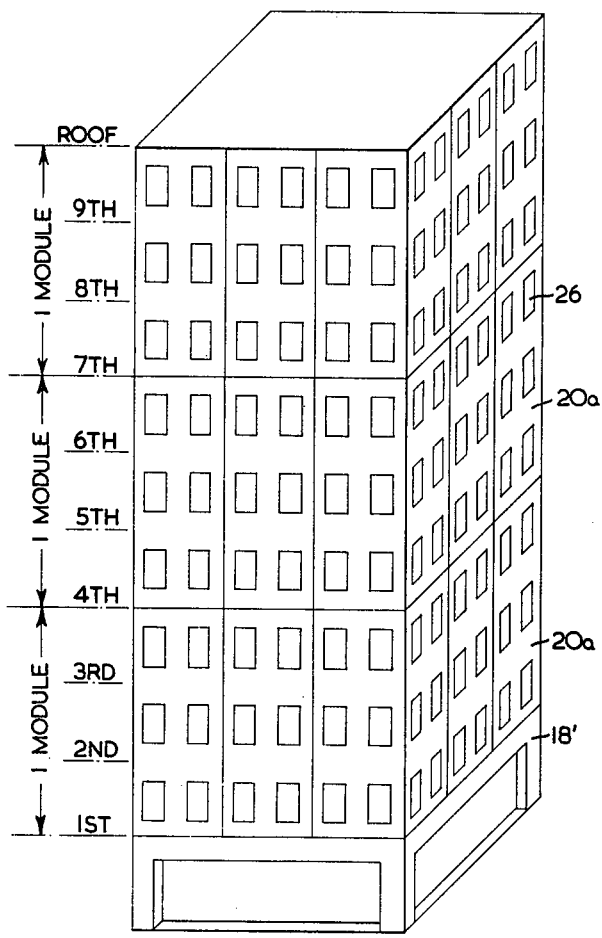
FIG. 3 illustrates a typical building having windows in its external load bearing walls, in which building the present invention finds application.

Returning now to FIG. 3 there is shown a building 3 very similar to that shown in FIG. 1 and including internal support columns and spaced apart floors as illustrated in FIG. 1 but wherein the external load bearing walls, which serve to support the marginal edges of the floors, are constructed from a plurality of panels 20a as illustrated in FIG. 10, each panel 20a being three floors high and incorporating window openings 26 therein. The structural load bearing walls and the internal support columns are supported by a foundation support 18' as previously described in connection with FIG. 1.

Figure 4:
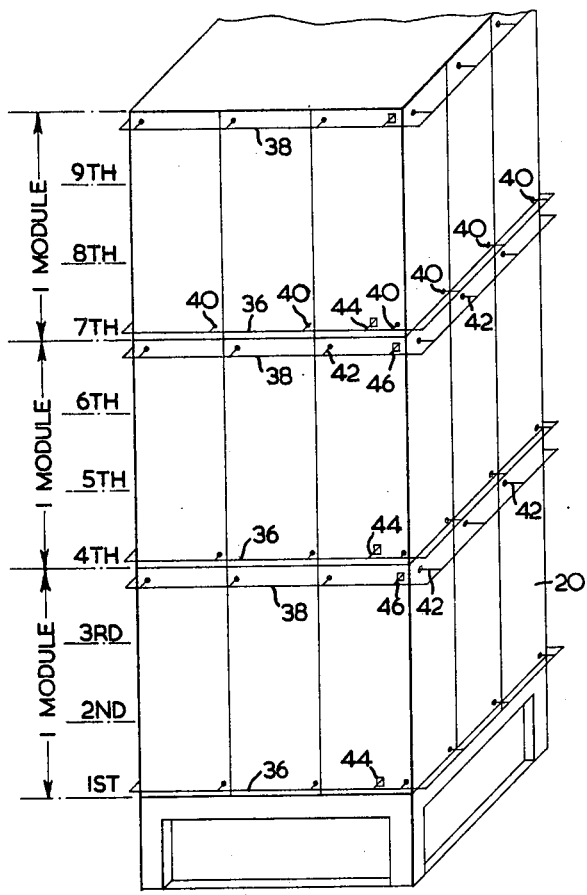
FIG. 4 shows a building having external load bearing walls according to the invention illustrating the use of external perimeter piping connected to the panels for the flow of liquid therethrough.

FIG. 4 shows a building incorporating the principles of the present invention, the side walls of which are formed by a plurality of liquid filled panels 20 as illustrated in FIG. 9. FIG. 4 illustrates the external perimeter piping arrangements for conveying the liquid to and from the various panels 20. Reference numeral 36 indicates the supply ring means which extend around the building, the supply ring means being connected to the inlets of each of the panels 20 via supply connections 40. Reference numeral 38 illustrates the several return ring means which extend around the periphery of the building and are connected to the returns from the panel via return connections 42. The supply ring means 36 and the return ring means 38 are, in turn, connected to supply means 44 and return means 46' respectively as indicated in FIG. 4.

It will be seen from FIG. 4 that the building may be considered to be made up from a series of vertically spaced modules, each module being three stories high as is each of the panels in that module. Each module is provided with its own liquid supply and return system.

Figure 7:
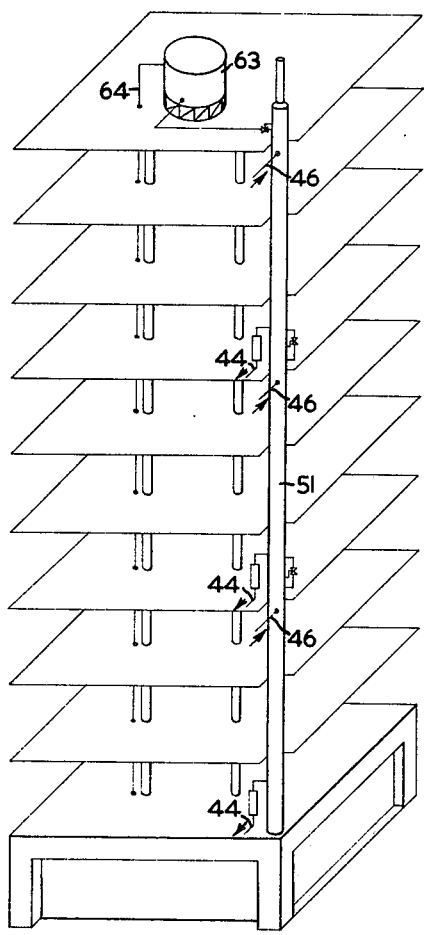
FIG. 7 illustrates a building with its structural load bearing walls removed illustrating water supply, vent system, heating, cooling and pumping units etc.
Figure 8:
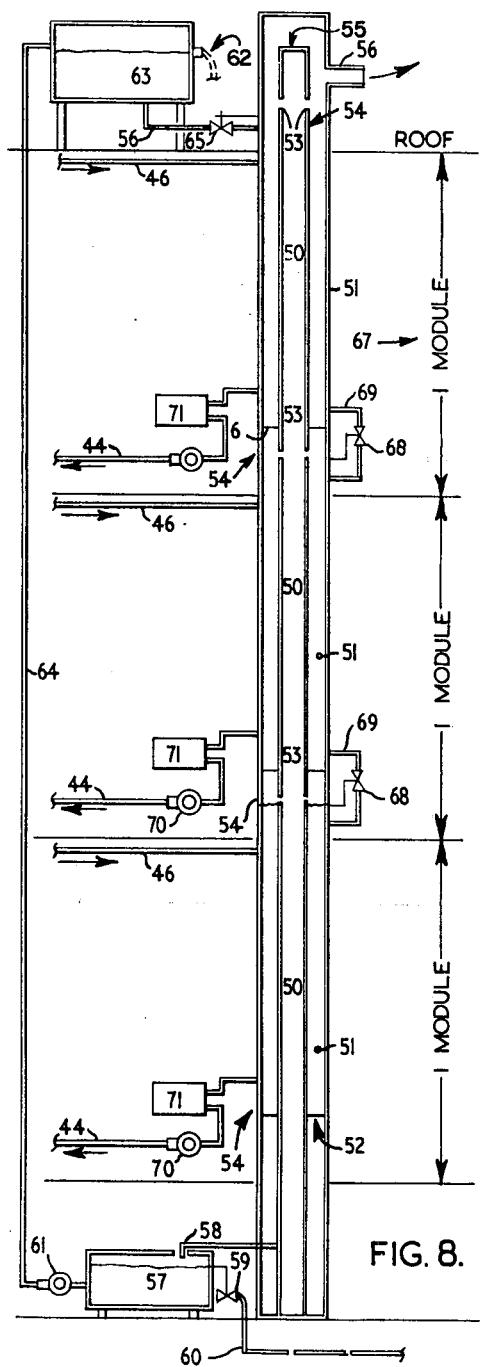
FIG. 8 is a diagrammatic section view taken through the system for regulating the head of liquid on each panel module.

FIG. 7 illustrates the building with the external load bearing walls removed and illustrates the liquid column and vent arrangement including supply and return means 44 and 46 and the location of the heating, cooling and pumping unit for each module of panels as will be hereinafter described. FIG. 8 is a section through the height of the liquid column which forms an integral part of the liquid make up system.

The liquid column consists of a vent and overflow pipe 50 inside a vertical liquid tank 51 running the height of the building.

The liquid tank is divided into separate tanks for each module by a sealed bottom plate 52 between the sides of the tank and the vent and overflow pipe. Holes 53 in the wall of the vent and overflow pipe just above the liquid level 54 of each module in the tank allow vapour to escape into the vent and overflow pipe and from there to atmosphere through the hole 55 in the top of the vent and overflow pipe and through the vent outlet 56 in the top of the tank.

If the liquid level in any tank rises above its operating level the liquid will spill over through the holes 53 into the vent and overflow pipe 50. Liquid will then pass down the pipe to the bottom of the vent and overflow pipe where it will drain into the bottom tank 57 through pipe 58.

The level in tank 57 is maintained at a minimum level by the float control valve 59 on the makeup liquid line 60.

A pump 61 controlled by a level control 62 on top storage tank 63 maintains a minimum level in the top storage tank 63 by drawing liquid from bottom tank 57 and pumping it up through line 64 to the top storage tank 63. A float control valve 65 in the supply line 66 maintains a minimum liquid level 54 in the liquid tank 51 for the top module. Float control valves 68 in transfer lines 69 maintain liquid levels 54 in their respective tanks for their respective modules.

Each module has its own pump 70 which draws water from the bottom of its liquid tank through a heating and cooling unit 71 which maintains the liquid at a constant temperature. The pump 70 delivers this liquid to the panels in its module through the supply main 44. The liquid returns from the panels through return main 46 to the top of the liquid tank 51.

The top storage tank 63 is sized to store sufficient makeup liquid so that if fire should occur on any floor there would be sufficient makeup liquid in the storage tank to maintain the panels completely filled for a duration required by local authorities.

If a fire should occur on any floor the heat may cause the water in the panels to boil. The vapour would either be drawn off by the return main 46 to the liquid tank 51 where it will escape into the vent and overflow pipe, or be vented directly to atmosphere through blow-off ports in the top of the panel itself.

As the liquid boils off, the water in the tank 51 for that affected module drops. This drop in liquid level 54 is detected by the float control 68 valve on the transfer line 69 from the module above, or if the affected floor is in the top module, the float control valve 65 on the supply line 66 from the top storage tank 63. In either case, the drop in liquid level 54 causes the valve to open allowing liquid to pass in the first case from the module above to the affected module and in the case of the top module, from the storage tank to the top module.

When the affected module is one of the lower modules in the building, so that the liquid is passed from the module above through the transfer line 69 to the affected module, this action lowers the liquid level 54 in the module above. This causes the float control valve 68 for the module above to open allowing the liquid from the module above that module to pass down to maintain the liquid level in the module above. This action is repeated right up to the top module, its level being maintained by the float control valve 65 in the transfer line 66 from the top storage tank 63, opening to permit water to pass from the tank to the top module.

Figure 5:
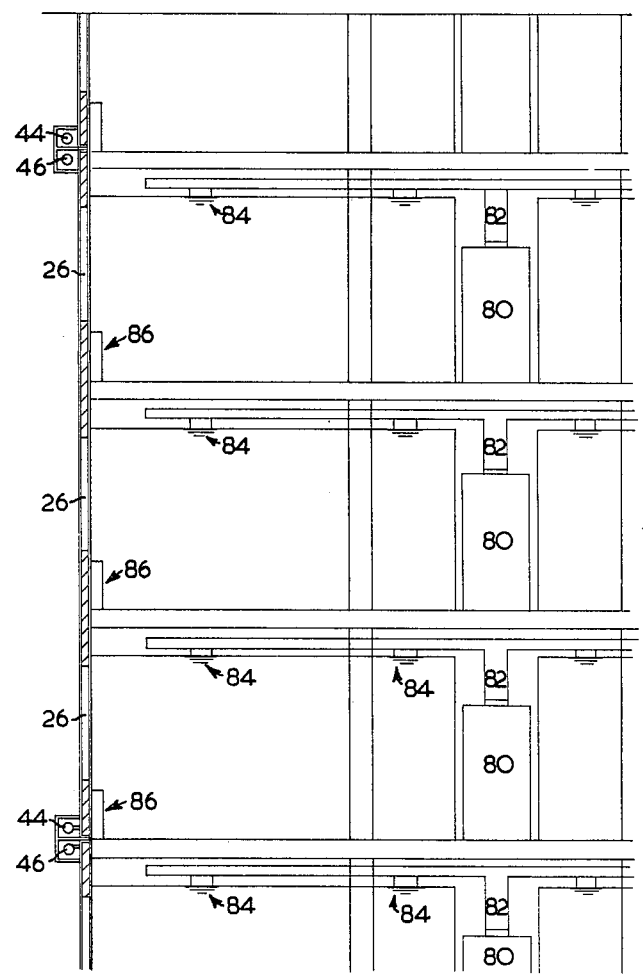
FIG. 5 is a section through a building structure having windows in the structural load bearing wall illustrating the use of perimeter heating and cooling units.

It was previously mentioned that the system of the present invention does not really act to heat or cool the building but rather serves to isolate the building interior from external heating and cooling loads. However, in the case of a building wherein windows are provided in the external load bearing walls as in FIG. 3, the external heating or cooling loads passing through such windows must be handled along with all internal heating and cooling loads by auxiliary means. FIG. 5 shows a section through a building module with window openings 26 being provided in the panels which make up the external load bearing walls. It will be seen that in order to cool internal heat gains arising within the building from sources such as lighting and other equipment, an air-conditioning or cooling unit 80 is provided on each floor coupled to air supply ducts 82 which supply air to the ceiling outlet fixtures 84 which are appropriately distributed throughout the building floor. It will also be seen that perimeter heating and cooling units 86 are disposed under the window openings 26 to offset external heating and cooling loads resulting from heat transmission through such windows. No further description of these auxiliary means is considered to be necessary as they are entirely conventional in nature.

Figure 6:
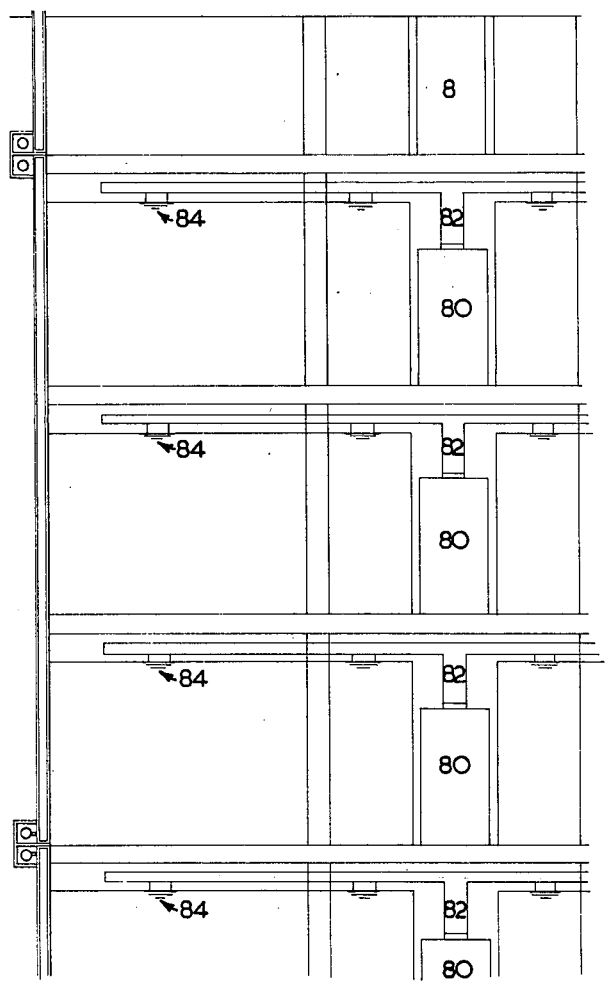
FIG. 6 is a section through a building module without windows illustrating the isolating effect of the liquid filled structural wall.

FIG. 6, which is a section through a building module without windows, illustrates the isolating effect of the liquid filled structural load bearing wall. Here it will be seen that the interior air handling system, as described previously in connection with FIG. 5, is capable of handling all internal heat gains from sources such as lighting etc. Since there are no openings in the liquid filled external wall, such wall isolates the interior of the building from external heating and cooling loads i.e. all external loads are absorbed by the liquid in the load bearing panels.

In both the arrangements of FIGS. 5 and 6, those skilled in the art will appreciate that the liquid is supplied to the hollow panels at room temperature. The temperature of the liquid circulating through the panels rises or falls depending upon the net heat transfer to or away from such panel. Water leaves the panel and returns to the central heating and cooling plant as described previously where it is returned to room temperature after which the water is then pumped back to the panels.

In order to properly evaluate the invention on an experimental basis, a test building structure incorporating the principles of the invention was constructed and the detailed structural features of same will now be described.

Referring to FIGS. 12–27 the test building structure takes the form of a box 101 supported by a pair of spaced wooden bearing beams 102 which form a framework with wooden base beams 103, the framework being maintained square by means of steel rods 104 and turnbuckles 105 which stretch diagonally across the framework. The bearing beams 102 and the base beams 103 are joined by steel plates 106 bolted to the base beams 103 and the bearing beams 102 and the rods 104 and turnbuckles 105 are mounted across the framework by means of the plates 106. The framework also includes wooden struts 107 to strengthen it.

The box 101 is formed of side wall portions 110, top wall portions 111 and bottom wall portions 112, the side wall portions 110 including a window 113 and a door 114. Each of the wall portions is formed from a pair of panel members 115 of the configuration set forth particularly in FIGS. 15 and 16. Each panel member 115 is formed from an inner steel plate 116 and an outer steel plate 117. The plate 116 includes inlet 118 and outlet 119 for the flow of liquid through the panel member 115, bases 120 and cross member 121 including holes 122 to allow the flow of liquid through the panel member 115.

The panel members 115 are joined at the center to form each wall portion as shown particularly in FIG. 11 by means of flanges 123 which are bolted by bolts 124, an asbestos gasket 125 being interposed between the panel members 115 and the joint on the inside surface of the panel members is covered by a tape 126.

Figure 19:
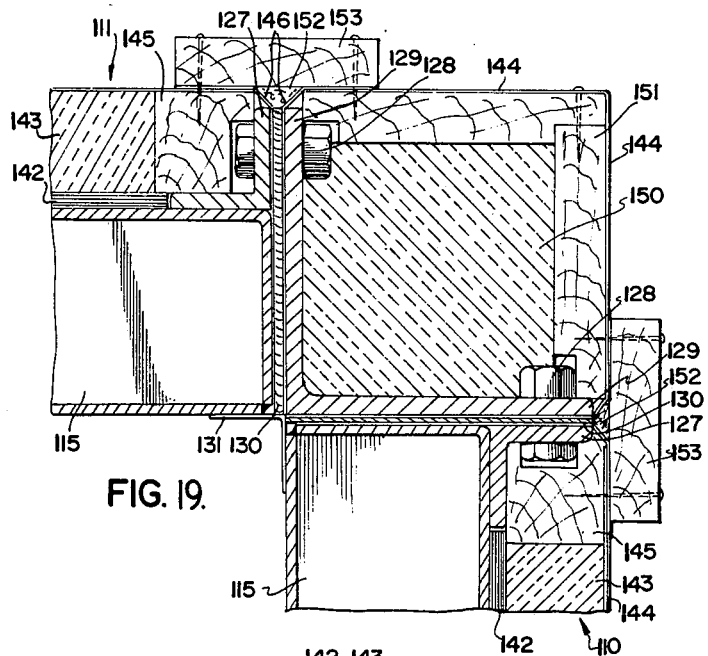
FIG. 19 is a detail vertical section of any of the joints of the building structure of FIG. 12 between the side and top wall portions.

The side wall portions 110 are joined to the top wall portions 111 as particularly shown in FIG. 19 by means of flanges 127 bolted by bolts 128 to angle iron 129 with asbestos gaskets 130 interposed between the angle iron 129 and the panel members 115. The inside surface of the joint is covered by tape 131.

Figure 20:
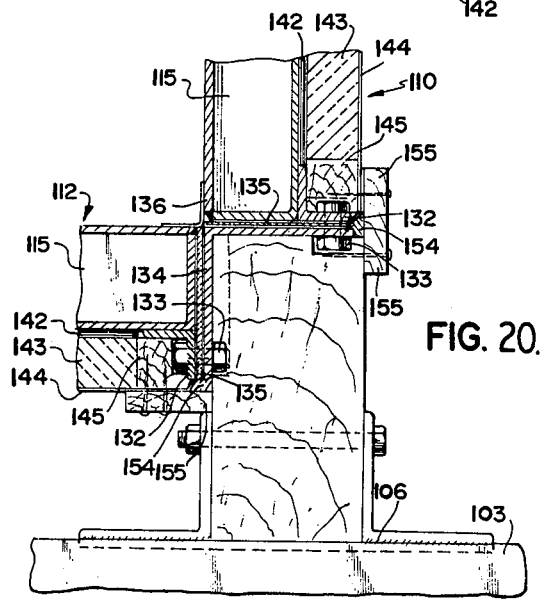
FIG. 20 is a detail vertical section of any of the joints of the building structure of FIG. 12 between the side and bottom wall portions.

The side wall portions 110 and the bottom wall portion are joined as particularly shown in FIG. 20 by means of flanges 132 bolted by bolts 133 to angle iron 134 with asbestos gaskets 135 therebetween. The inside surface of the joint is covered by tape 136. The box 101 is supported on beams 102 by means of angle irons 134 which are located on the beams 102.

Figure 21:
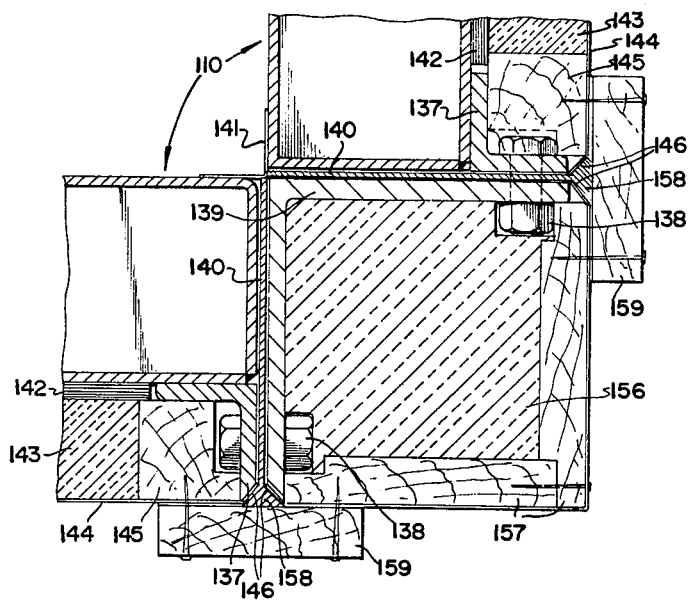
FIG. 21 is a detail cross section of the joint between the wall portions of the prototype structure of FIG. 12.
Figure 26:
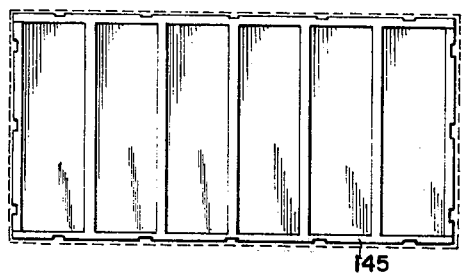
FIG. 26 is a plan view of a wooden ladder framework for holding the insulation on the outside of the structure of FIG. 12.

The side wall portions 110 are joined together at the corners as shown particularly in FIG. 21 by means of flanges 137 bolted by bolts 138 to angle irons 139 with asbestos gaskets 140 interposed between the angle iron 129 and the panel members 115. The inside surface of the joint is covered by tape 141.

The outside surface of the panel members 115 forming the wall portions of the box 101 is covered with prefabricated insulation panels comprising of wooden ladder frames 145 with recesses to accommodate bolts 129, backed with sheet plywood 142, filled with insulation 143 and finished externally with sheet steel 144 returned around outside edges of ladder frame ½ inch and nailed to same. The prefabricated insulation panels are held in position by steel strips 146 shown in FIG. 13.

Figure 22:
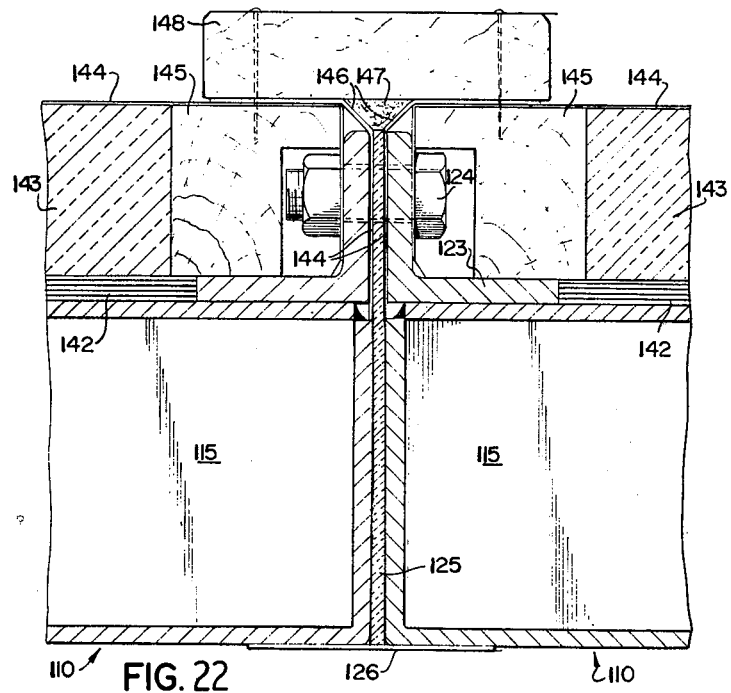
FIG. 22 is a detail cross section of the joint between a pair of panel members in the same wall portion in the prototype structure of FIG. 12.

Referring to FIG. 22 steel strips 146 are engaged between the flanges, holed to take bolts 124 at each bolt position in the flanges of the panel members 115 and nailed to prefabricated insulation panels. The gap between the adjacent prefabricated insulation panels is filled with insulation 147 and a wooden batten 148 being nailed thereover.

Referring to FIG. 19 the angle iron 129 accommodates the insulation 150 enclosed by wooden strips 151 to which is nailed steel sheet 144. Again as in FIG. 22 the sheet steel strips 146 are engaged between the angle iron 129 and the flanges 127 at each bolt positon and nailed to wooden strips 157, the gap being filled by insulation 152 and the joint covered by battens 153.

Referring to FIG. 20 the sheet steel strips 146 are engaged between the angle iron 134 and the flanges 132, the gaps being filled with insulation 154 and the joints covered by battens 155.

Referring to FIG. 21 the angle iron 139 accommodates insulation 156 enclosed by wooden strips 157 to which the sheet steel 144 is attached with ½ inch returns at ends and nailed to wooden strips, held in position by the sheet steel strips 146 being engaged between the angle 139 and the flanges 137 the gap so formed being filled by the insulation 158 and joints being covered by battens 159.

As shown in FIG. 12 the box 101 includes an insulated door 114 which is particularly shown in FIGS. 24 and 25. The door 114 is formed from a central insulation core 160 in a wooden framework 161 and faced with plywood 162 and steel sheet 144. The door 114 includes in the framework 161 Neoprene seal 163 to seal with the door frame which also includes Neoprene 164. The door opens on hinges 165 and has exterior bolt mechanism 166 and interior bolt mechanism 167.

Figure 23:
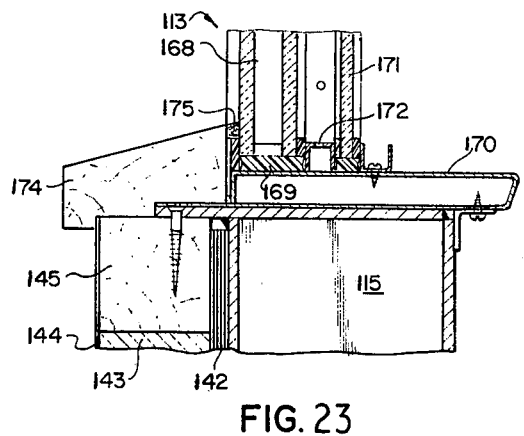
FIG. 23 is a detail vertical section of the lower portion of the window in the prototype structure of FIG. 12.

As shown in FIG. 12 the box 101 also includes a window 113 which is particularly shown in FIG. 23. The window comprises a steel window unit 168 seated in a Neoprene gasket 169 on steel casings 170 and a second window 171 spaced by spacer 172 in a Neoprene gasket 173. The window includes a wooden sill 174 and mastic 175. The mounting of the upper end of the window 113 is similar to the lower end thereof.

Figure 27:
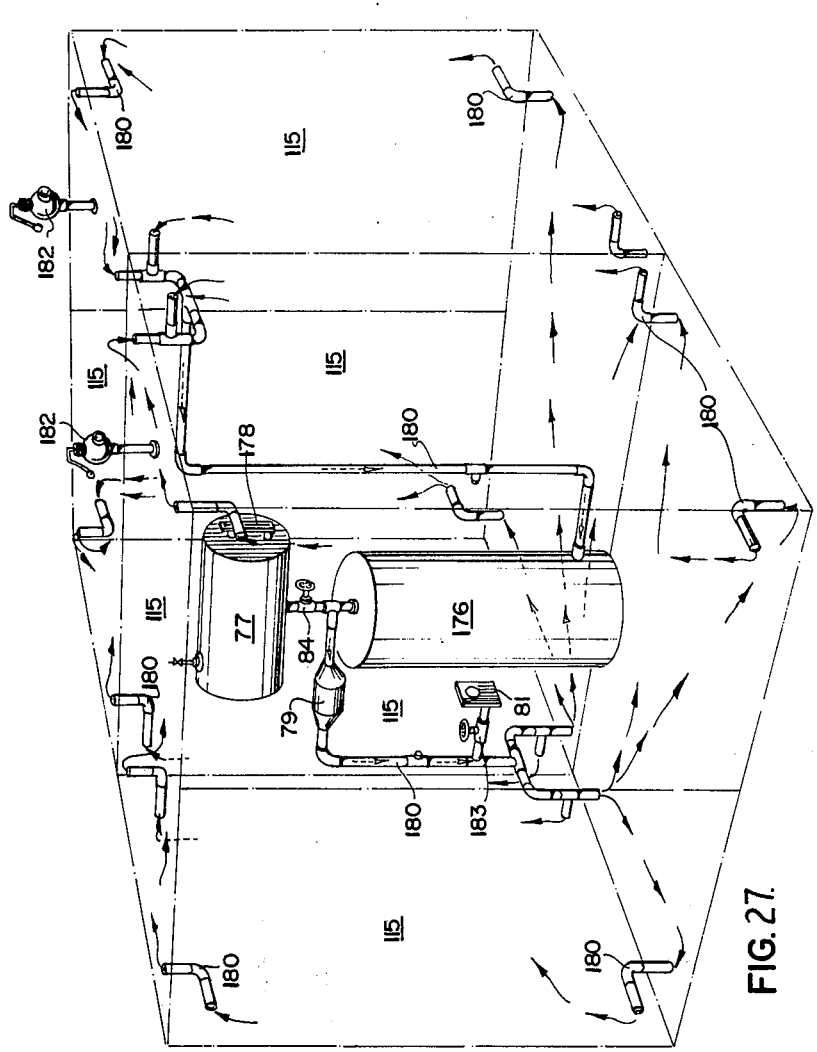
FIG. 27 is a schematic representation of the prototype structure of FIG. 12 showing the flow paths of aqueous liquids through the structure.

The flow pattern of the aqueous liquid through the panel 116 of the wall portion of the box 101 is shown in FIG. 27 and is to a great extent self-explanatory. The aqueous liquid is heated in tank 176 connected via valve 184 to expansion tank 177 including sight glass 178 and is pumped by pump 179 through conduits 180 which include a flow meter 181 and a valve 183 through the panel members 115 as indicated in FIG. 27, the liquid finally being returned to the tank 176. The conduits 180 include vents with blower valves 182 extending through the top portion 111 of the box 101.

In one test of the effectiveness of a test structure according to the present invention a test panel shown in FIG. 15, made of 3/16 inch steel plate providing a cavity of dimensions 10 feet × 5 feet × 4 inches and having a liquid capacity of approximately 50 gallons was installed on the north facing end of a seminsulated test building. A mixture of water and antifreeze was circulated at a flow rate of 1 gallon per minute and at a temperature of 70° ± 2°F. through the test panel. The air temperature inside the building was 70° ± 3°F. The temperature distribution was measured simultaneously across the air side and the liquid side of such a panel with panels (a) having no insulation on either side, (b) 1 inch insulation on the inside only and (c) 1 inch insulation on the inside and outside. The results were taken over several days and the outside air temperature was measured. The circulating liquid temperature and the inside temperature of the building were maintained substantially equal in order to eliminate heat transfer between the two. Further, the inlet and outlet temperatures of the liquid circulating through the panel were measured.

The results obtained are shown in the following Table.

TABLE

| Panel Condition | Date Day/Month | Time | Outside Air Temp. °F. | Plate Temperature °F. | | Δ t |
|---|---|---|---|---|---|---|
| | | | | Air Side | Liquid Side | |
| No Insulation | 18/1 | 2400 | 0 | 51 | 62 | 11 |
| Either Side | 19/1 | 0200 | −1 | 51 | 63 | 12 |
| | | 0400 | 0 | 52 | 64 | 12 |
| | | 0600 | +1 | 53 | 65 | 12 |
| | | 0800 | +6 | 51 | 63 | 12 |
| | | 1800 | +15 | 55 | 66 | 11 |

TABLE-continued

| Panel Condition | Date Day/Month | Time | Outside Air Temp. °F. | Plate Temperature °F. Air Side | Plate Temperature °F. Liquid Side | Δ t |
|---|---|---|---|---|---|---|
| | | 2000 | +15 | 53 | 65 | 12 |
| | | 2200 | +11 | 55 | 65 | 10 |
| | | 2400 | +7 | 53 | 64 | 11 |
| | 20/1 | 0400 | +3 | 53 | 65 | 12 |
| | | 0800 | +5 | 56 | 65 | 9 |
| | | 1600 | +14 | 61 | 67 | 6 |
| | | 2000 | +25 | 56 | 61 | 5 |
| | | 2400 | +23 | 57 | 61 | 4 |
| 1" Insulation Inside Only | 26/1 | 1600 | −1 | 58 | 72 | 14 |
| | | 1800 | 0 | 58 | 71 | 13 |
| | | 2000 | −1 | 57 | 71 | 14 |
| | | 2200 | −4 | 56 | 71 | 15 |
| | | 2400 | −8 | 58 | 70 | 12 |
| | 27/1 | 0200 | −11 | 59 | 69 | 10 |
| | | 0400 | −13 | 54 | 69 | 15 |
| | | 0600 | −15 | 57 | 71 | 14 |
| | | 0800 | −16 | 54 | 68 | 14 |
| 1" Insulation Inside & Outside | 2/2 | 0930 | −14 | 65 | 69 | 4 |
| | 8/2 | 0940 | +1 | 69 | 71 | 2 |
| | | 1345 | +16 | 70 | 71 | 1 |
| | 10/2 | 0800 | +6 | 72 | 72 | 0 |
| | | 1500 | +14 | 72 | 72 | 0 |
| | 11/2 | 0815 | +17 | 72 | 72 | 0 |
| | 9/2 | 0815 | −6 | 70 | 71 | 1 |
| | | 1430 | +14 | 71 | 71 | 0 |
| | 12/2 | 0830 | +7 | 71 | 72 | 1 |
| | | 1540 | +11 | 70 | 71 | 1 |

It will be seen that the measurements were taken on various days of the particular month with various wind velocity and directions and with various temperatures, varying from about −4°F. to about 25°F. Irrespective of the climatic conditions it was found possible to maintain a uniform temperature distribution across the face of the outer steel skin and there is no measurable temperature difference between the inlet and outlet liquid even at very low liquid flow rates. It will be seen from the Table that the system has a great temperature stability demonstrated by the low differences in temperature (Δ t) even at low outside temperatures. Of course a building fabricated from such panels will be dimensionally stable thus reducing structural strain to an absolute minimum.

It will be seen from the foregoing description that the primary advantage of the present invention relates to the stabilization of the building by maintaining the structural load bearing walls etc. of the building at substantially constant temperature in spite of external temperature fluctuations. Thus, the cyclic stresses to which conventional building structures are subjected are eliminated in the present invention. However, in addition to the stabilization of the structure afforded by the invention, those skilled in the art will realize that the invention allows economic modular assembly of the building with a minimum of skilled labor and on site delay. The individual panels may be shop fabricated under controlled conditions and adapted for assembly by simple bolting procedures. The rectangular panels may be made dimensionally identical for positioning in their final locations in the top wall portions, bottom wall portions or side wall portions of the building structure. The interchangeability of the components made possible by the invention facilitates scheduling during fabrication, shipping and assembly thus permitting reduction in overall costs. The structural steel panels may be also designed such as to permit elimination of heavy structural bracing and framing members normally required in a building to resist horizontal and vertical thermal movements and to resist seismic and lateral wind forces thereby increasing the efficiency of the resisting moment geometry to a maximum. By allowing removal of expensive bracing in the core area greater freedom of access to the core is permitted.

In the event of a fire in a building according to the invention, the heat will be carried away by the forced circulation of the liquids through the panel and structural failure of the external load bearing walls is unlikely. The mechanical cost of fire protection may be reduced due to the superior fire rating of the building construction andd sprinkler and fire stand pipe requirements may become less stringent in certain jurisdictions.

Other advantages of the invention include, among other things, the fact that a large volume of liquid is contained in the system and its high thermal capacity has a storage effect which results in a reduction of peak cooling and heating loads. Arrangements can be made to pump heat from the interior zone of the building to the exterior zone of the building to reduce heating loads. More efficient use can be made of heat generated within the building in cold weather from sources such as the lighting systems. Other advantages of the invention will be apparent to those skilled in the art.

We claim:

1. A building structure wherein the walls of same which are in thermal communication with the external atmosphere are adapted to bear at least a portion of the loads imposed by the structure, said load bearing walls being formed by a plurality of contiguous, liquid tight, hollow panels, each panel including an outwardly facing wall portion in thermal communication with the external atmosphere and an inwardly facing wall portion spaced from the first mentioned wall portion and in thermal communication with the internal atmosphere of the building structure so that when an aqueous liquid flows through each panel such liquid is in direct contact with the respective spaced apart inner surfaces of said outwardly and inwardly facing wall portions, each of said panels including inlet means for the introduction of liquid therein and outlet means for the removal of liquid therefrom, said inlet and outlet means of said panels being connected to provide such flow of the aqueous liquid through said panels, pumping means for forcing the liquid through said panels, and heating or cooling means for maintaining the temperature of the aqueous liquid passing through said panels whereby to maintain said load bearing walls substantially at a selected temperature to improve the stability of the building structure.

2. A building structure according to claim 1 wherein each said panel is made of steel, is rectangular in outline, and is connected at its marginal edges to the panels next adjacent thereto.

3. A building structure according to claim 1 wherein the structure includes further load bearing means located inside the building in thermal contact with the internal atmosphere of the building structure, with differential thermal expansion between the structural load bearing walls and said further load bearing means being reduced or eliminated by virtue of the substantially constant temperature of the load bearing walls.

4. A structure as claimed in claim 3 which is a multi-storey building.

5. A structure as claimed in claim 4 wherein the load bearing walls of said multi-storey building are subdivided into a plurality of zones with the inlet and outlet means of said panel members being connected such that the liquid flows in the several zones are independent of each other.

6. A structure as claimed in claim 3 in which each panel member is in the form of a rectangular steel section.

7. A structure as claimed in claim 1 wherein a layer of insulation is disposed on the exterior surfaces of the load bearing walls to reduce heat transfer therethrough.

8. A multi-storey structure according to claim 4 including a plurality of vertically spaced floors each connected at their margins to said load bearing walls for support thereby, said further load bearing means including a plurality of interiorly located load bearing columns in thermal contact with the internal atmosphere of the building, said columns being connected in supporting relation to the vertically spaced floors.

9. A structure as claimed in claim 8 wherein the load bearing walls of said multi-storey building are subdivided into a plurality of zones with the panels being connected such that the liquid flows in the several zones are independent of each other.

10. A structure as claimed in claim 8 in which each panel is in the form of a rectangular steel section.

11. A structure as claimed in claim 8 wherein a layer of insulation is disposed on the exterior surfaces of the load bearing walls to reduce heat transfer therethrough.

12. A structure as claimed in claim 8, wherein at least one of said structural walls has windows therein, and auxiliary heating or cooling means being provided to compensate for heat transfer through said windows.

13. A structure according to claim 9 including liquid supply and make up means for regulating the hydrostatic pressure of liquid in each said zone and for supplying additional liquid to maintain said panels in a completely filled condition.

* * * * *